July 21, 1936. H. D. GEYER 2,048,256
OSCILLATING PIVOT JOINT UNIT
Filed Sept. 15, 1933

INVENTOR
Harvey D. Geyer
BY
Spencer Hardman & Fehr
his ATTORNEYS

Patented July 21, 1936

2,048,256

UNITED STATES PATENT OFFICE

2,048,256

OSCILLATING PIVOT JOINT UNIT

Harvey D. Geyer, Dayton, Ohio, assignor, by mesne assignments, to General Motors Corporation, Detroit, Mich., a corporation of Delaware Application September 15, 1933, Serial No. 689,640

5 Claims. (Cl. 287—85)

This invention relates to metal-isolating oscillating pivot joints adapted for use in spring shackles of automobiles and other various link connections where the pivotal hinge movement is confined to a small arc.

Oscillating joint units comprising inner and outer metal sleeves with an axially elongated resilient rubber bushing compressed therebetween are now well known, as exemplified by Patent No. 1,734,025 to Zeibig, October 29, 1929, and by Patent No. 1,827,233 to Hughes, October 13, 1931.

An object of this invention is to provide similar improved oscillating joint units which permit relatively easier rotary oscillating movement between the inner and outer sleeves by internal distortion of the rubber without at the same time correspondingly facilitating the endwise movement between said sleeves.

A more specific object is to provide an oscillating joint unit having inner and outer sleeves having elongated resilient rubber blocks extending axially between said sleeves and held under high radial compression therebetween.

Another object of the invention is to provide a simple and efficient method of making such joint units.

Further objects and advantages of the present invention will be apparent from the following description, reference being had to the accompanying drawing, wherein a preferred embodiment of one form of the present invention is clearly shown.

In the drawing:

Fig. 3 is an end elevation of the partially completed unit.

Fig. 4 is a section taken on line 4—4 of Fig. 3.

Similar reference characters refer to similar parts throughout the several views.

Figure 2:
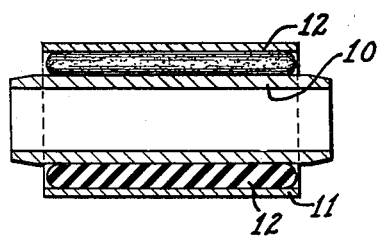
Fig. 2 is a section taken on line 2—2 of Fig. 1.
Figure 4:
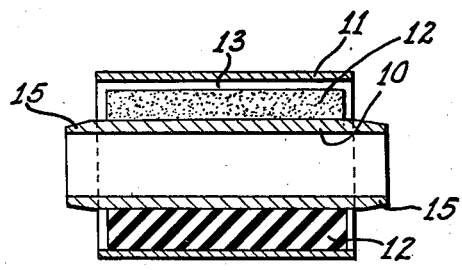
Figs. 3 and 4 illustrate a partially completed unit, that is, after the rubber blocks have been vulcanized in situ between the two metal sleeves but before the outer sleeve has been swaged down to its final reduced diameter.
Figure 3:
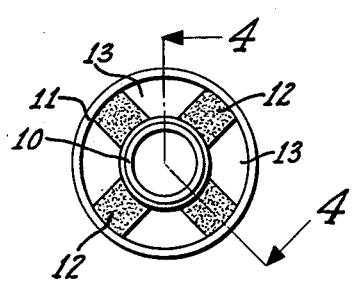

The central metal pivot pin 10 is shown as a hollow sleeve and of greater length than the outer metal sleeve 11. Figs. 3 and 4 show the inner sleeve 10, the unreduced outer sleeve 11, and four elongated resilient rubber blocks 12 properly assembled within the annular space between the two sleeves 10 and 11. Preferably the rubber blocks 12 are bonded by vulcanization to both the inner and outer sleeves in such a way as to keep the sleeves concentric. This may be done by properly locating sleeves 10 and 11 in the vulcanizing mold and inserting the uncured rubber blocks 12 in spaced relation within the annular chamber therebetween with arc-shaped metal cores which fit snugly in the spaces 13 between the rubber blocks. The outer surface of sleeve 10 and the inner surface of sleeve 11 are specially prepared, preferably by brass plating, so that a strong vulcanized bond between the rubber and metal will be obtained by the vulcanizing process. After vulcanization the cores are removed endwise from the unit shown in Figs. 3 and 4 leaving the four spaces 13 unfilled. The outer sleeve 11 is then reduced in diameter to the finished size shown in Figs. 1 and 2, preferably by a swaging operation, thus spreading and flattening out the rubber blocks 12 until they almost or entirely fill the intervening spaces 13, as shown in Figs. 1 and 2.

Figure 1:
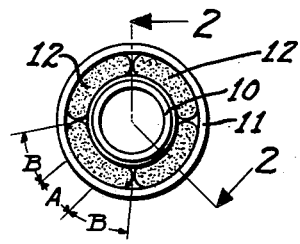
Fig. 1 is an end elevation of a joint unit made according to this invention.

It will be observed that in the finished unit the flattened rubber blocks 12 will be bonded to the sleeves 10 and 11 only over the contacting area represented by the arc "A" in Fig. 1, while over the remaining contacting area represented by the arcs "B" the rubber is not bonded to the metal but is pressed tightly thereagainst. Hence when sleeve 10 rotates through a considerable arc relative to sleeve 11 the bonded portion of the rubber blocks represented by the arc "A" will first be tilted in a peripheral direction and then be put in tension, while the remaining unbonded side portions of the rubber blocks will be free to separate from the sleeves 10 and 11 and hence have a sort of rolling motion thereupon. Hence it will be clear that relative rotary oscillating motion between sleeves 10 and 11 is greatly facilitated by the side portions represented by the arcs "B" being unbonded to the contacting metal surfaces and thus being permitted to roll thereupon.

However relative axial movement between sleeves 10 and 11 will be resisted by substantially the full length and width of the rubber blocks 12 being put in lengthwise or axial shear (see Fig. 2) almost as highly as if the entire contacting areas of blocks 12 were actually bonded to the metal surfaces of sleeves 10 and 11. This effect is due to the fact that the axial length of the rubber block portions represented by arcs "B" is many times greater than their width or peripheral dimension and hence there can be little or no endwise rolling of these portions upon the metal sleeves 10 and 11. In other words the rubber portions "B" will be put in axial shear substantially as much as if they were actually bonded to the contacting metal surfaces.

Figure 5:
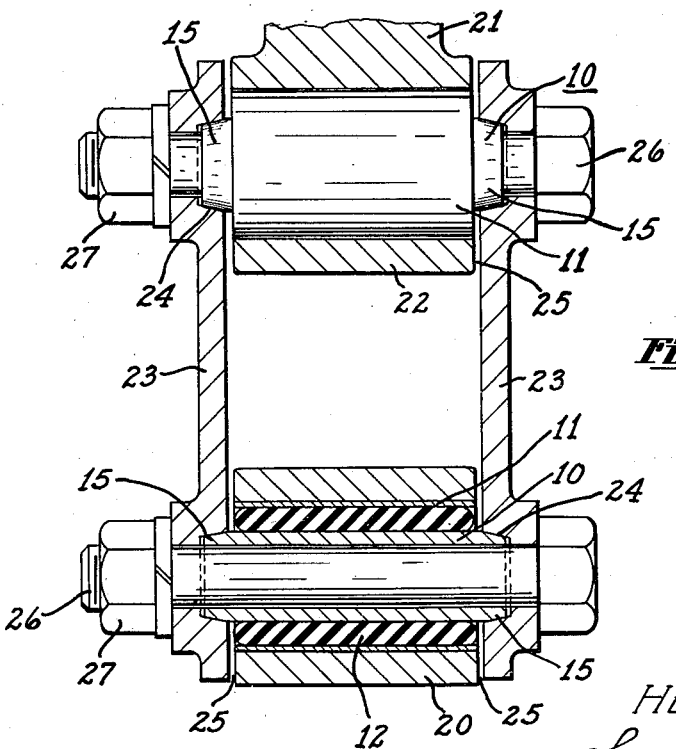
Fig. 5 shows an assembled automobile spring shackle using the joint units of this invention, the lower joint unit being shown in section and the upper joint unit in side elevation.

Fig. 5 shows two joint units of this invention fully assembled in an automobile spring shackle. In assembling, one of the joint units is suitably fixed to the spring eye 20 preferably by a pressed fit of the outer sleeve 11 therein. Another of the joint units is fixed to the bracket 21 of the chassis frame, also preferably by a pressed fit within the eye 22 of the bracket. The projecting ends 15 of the inner sleeve 10 extend laterally outward beyond the ends of bracket eye 22 and spring eye 20 sufficiently to be clamped tightly up against the two side links 23 of the shackle and still leave the desired end clearance spaces 25 between the side links and the eyes 20 and 22. Preferably the projecting ends 15 of sleeve 10 are beveled to fit snugly and be clamped tightly within the correspondingly beveled sockets 24 in side links 23. The two bolts 26 are inserted through holes in links 23 and through the inner sleeves 10 and the nuts 27 thereon set up tight to rigidly fix the two inner sleeves 10 and the two side links 23 together.

In operation, the links 23, bolts 26, and inner sleeves 10 swing as a rigid unit while the necessary rotary oscillating movement between the inner sleeves 10 and the outer sleeves 11 is permitted by the distortion of the resilient rubber blocks 12 as described in detail above. Lateral movement between side links 23 and the eyes 20 and 22 is resiliently opposed by the resistance of the rubber blocks 12 to axial distortion as described in detail above. The clearances 25 permit a desired amount of lateral movement of links 23 without contacting the eyes 20 and 22.

While the form of embodiment of the present invention as herein disclosed, constitutes a preferred form, it is to be understood that other forms might be adopted, all coming within the scope of the claims which follow.

What is claimed is as follows:

1. A metal-isolating oscillating pivot joint unit adapted to connect two relatively oscillating members, comprising: an inner pivot member adapted to be fixed to one of said connected members, an outer pivot member surrounding said inner member and forming an isolating chamber therebetween, and a plurality of initially peripherally spaced elongated resilient rubber blocks extending axially within said chamber and initially bonded by vulcanization to said inner and outer members, said rubber blocks being radially so compressed by said inner and outer members subsequent to their initial bonding by vulcanization as to spread said rubber blocks peripherally and materially increase their bearing area upon said inner and outer members.

2. A metal isolating oscillating pivot joint unit comprising: an inner metal pivot member, an outer pivot member surrounding said inner member and forming a chamber therebetween, a plurality of initially peripherally spaced elongated resilient rubber blocks extending axially within said chamber and held in surface-bonded relation upon said inner member over their initial contacting areas, said elongated blocks being highly compressed by a permanent radial compression by said inner and outer pivot members, said elongated blocks being maintained materially bulged outwardly in a peripheral direction by said radial compression so as to materially increase their bearing areas upon said inner member beyond said initial surface-bonded areas.

3. A metal-isolating oscillating pivot joint unit adapted to connect two relatively oscillatable members, comprising: an inner pivot member adapted to be fixed to one of said connected members, an outer pivot member adapted to be fixed to the other of said connected members and surrounding said inner member and forming an isolating chamber therebetween, a plurality of permanently radially compressed initially peripherally spaced resilient rubber bodies in said chamber and held in surface-bonded relation upon said inner and outer members over only the central portion of their contacting areas.

4. A metal-isolating oscillating pivot joint unit adapted to connect two relatively oscillatable members, comprising: an inner pivot member adapted to be fixed to one of said connected members, an outer pivot member adapted to be fixed to the other of said connected members and surrounding said inner member and forming an isolating chamber therebetween, a plurality of permanently radially compressed initially peripherally spaced resilient rubber bodies in said chamber and held by vulcanization in situ upon said inner and outer members over only the central portion of their contacting areas.

5. A metal-isolating oscillating pivot joint unit adapted to connect two relatively oscillatable members, comprising: an inner pivot member adapted to be fixed to one of said connected members, an outer pivot member adapted to be fixed to the other of said connected members and surrounding said inner member and forming an isolating chamber therebetween, a series of initially peripherally spaced resilient rubber bodies in said chamber surface-bonded to at least one of said pivot members and held under a permanent equalized radial compression and thereby peripherally spread out between said inner and outer members in such manner that when said inner and outer members are relatively rotated through an arc the peripheral side portions of said rubber bodies have a relative rolling motion thereupon by a simultaneous internal distortion of the rubber.

HARVEY D. GEYER.